Figure 1:
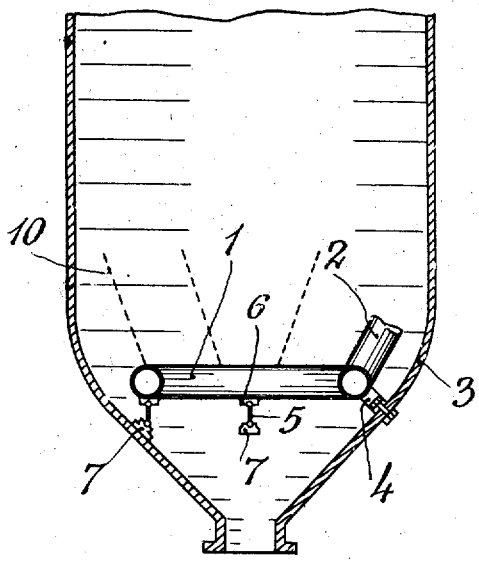

May 30, 1933. E. MORTERUD Re. 18,845

BOTTOM SIEVE FOR WOOD PULP DIGESTERS

Original Filed Dec. 26, 1930

Inventor:
Einar Morterud,
By E. F. Wenderoth
Atty

Reissued May 30, 1933 Re. 18,845

UNITED STATES PATENT OFFICE

EINAR MORTERUD, OF TORDEROD, NEAR MOSS, NORWAY

BOTTOM SIEVE FOR WOOD PULP DIGESTERS

Original No. 1,833,848, dated November 24, 1931, Serial No. 504,904, filed December 26, 1930, and in Norway August 19, 1930. Application for reissue filed June 14, 1932. Serial No. 617,231.

The present invention relates to the type of wood pulp digesters, in which the circulation conduit for the digesting liquor is connected with an annular sieve located near the outlet opening of the digester, and the object of the invention is to provide a sieve arrangement, by means of which it is made possible for the sieve to expand and contract freely under the influence of temperature variations, whereas on the other hand the arrangement of the sieve is such that it is not likely to cause congestion of the pulp near the outlet or prevent the easy emptying of the digester. This is obtained in accordance with the present invention by that the annular sieve is only secured to the digester proper at one point of its circumference, whereas it is supported at other points of its circumference in such a manner that a free movement of the sieve may take place with regard to the digester.

Two forms of the invention are illustrated on the drawing.

Figure 3:
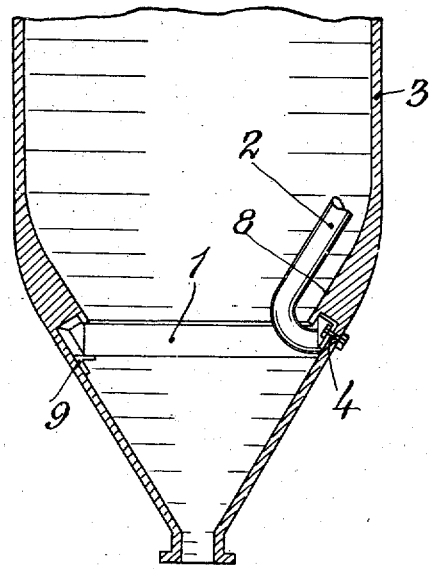
Figure 2:
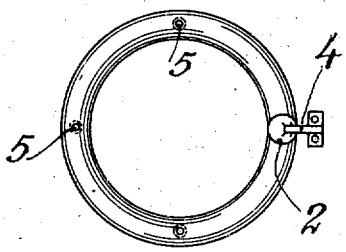
Figure 4:
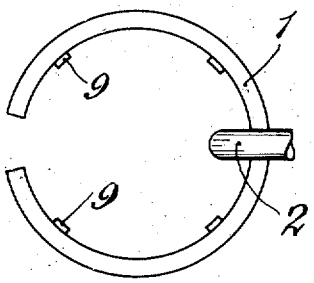

Figs. 1 and 2 are axial sectional view and plan of one form of the invention, and Figs. 3 and 4 are corresponding views of another form of the invention.

According to the forms illustrated on Fig. 1, 1 is the bottom sieve, which may be in the form of a closed annular or polygonal body and which is connected at one point of its circumference with the circulation conduit 2 leading to the circulation pump. At or adjacent the connecting point with the conduit or tube 2 the annular sieve 1 is secured to the digester 3 by means of a stay 4, which is firmly secured to the shell of the digester, and at a number of other points of its circumference the annular sieve is supported by means of pins or rods 5, both ends of which rest in spherical bearings 6, 7 so as to permit the pins or rods to swing freely in all directions.

Instead of being supported by pins or rods as illustrated the sieve may also be supported by means of wires or chains 10 as indicated on the drawing.

According to the form of the invention illustrated on Figs. 3 and 4 sieve 1 is in the form of an open ring or polygon (horse shoe form) and is located below a stationary abutment 8 formed integral with the interior lining of the digester and serving to conduct the pulp over and past the sieve during the emptying of the digester. According to this form of the invention the sieve is also firmly secured to the digester shell at a point adjacent the place at which the circulation conduit 2 is connected (bolt 4), whereas on the rest of its circumference it is placed loosely on brackets or shelves as indicated at 9, permitting the sieve to expand and contract freely.

I claim:—

1. In a wood pulp digester a circulation conduit for the digesting liquor, a sieve of substantially annular shape connected with said circulation conduit and located in the lower part of the digester near the outlet opening thereof, and supporting means for said sieve pivotally connected with the digester walls so as to permit movements of the said sieve with regard to the digester in a plane parallel to the plane of the annular sieve body.

2. In a wood pulp digester a circulation conduit for the digesting liquor, a sieve connected with said circulation conduit and located in the lower part of the digester near the outlet opening thereof, and supporting means for said sieve pivotally connected with the digester walls so as to permit movements of the said sieve with regard to the digester in a plane parallel to the plane of the sieve body.

In testimony whereof I have signed my name.

EINAR MORTERUD. [L. S.]